(12) United States Patent
Beutner

(10) Patent No.: US 9,879,713 B2
(45) Date of Patent: Jan. 30, 2018

(54) INSERT FOR SECURING CABLES, CABLE LINES AND WIRES IN A BICYCLE FRAME

(71) Applicant: Winora-Staiger GmbH, Sennfeld/Schweinfurt (DE)

(72) Inventor: Ingo Beutner, Gemuenden (DE)

(73) Assignee: Winora-Staiger GmbH, Sennfeld/Schweinfurt (DE)

(*) Notice: Subject to any disclaimer, the term of this patent is extended or adjusted under 35 U.S.C. 154(b) by 0 days.

(21) Appl. No.: 14/470,370

(22) Filed: Aug. 27, 2014

(65) Prior Publication Data
US 2015/0059513 A1 Mar. 5, 2015

(30) Foreign Application Priority Data

Aug. 28, 2013 (DE) .................. 10 2013 014 338

(51) Int. Cl.
*F16C 1/10* (2006.01)
*B62K 19/30* (2006.01)
(Continued)

(52) U.S. Cl.
CPC .............. *F16C 1/103* (2013.01); *B62K 19/30* (2013.01); *F16C 1/262* (2013.01);
(Continued)

(58) Field of Classification Search
CPC ... Y10T 74/2045–74/20462; B62J 2099/0046; B62K 19/30; B62K 21/12;
(Continued)

(56) References Cited

U.S. PATENT DOCUMENTS

| 4,102,219 A | 7/1978 | Plamper |
| 4,473,024 A * | 9/1984 | Armstrong ............... B63H 9/10 114/111 |

(Continued)

FOREIGN PATENT DOCUMENTS

| CN | 2707599 | 7/2005 |
| EP | 2159140 | 3/2010 |

(Continued)

OTHER PUBLICATIONS

European Search Report dated Nov. 3, 2014 from counterpart App No. 14002967.9.

(Continued)

*Primary Examiner* — Richard W Ridley
*Assistant Examiner* — Brian McGovern
(74) *Attorney, Agent, or Firm* — Shuttleworth & Ingersoll, PLC; Timothy Klima

(57) ABSTRACT

An insert is removably fastened in an opening on a bicycle frame for securing cables, cable pulls, or lines routed through the opening. The insert includes a pass-through opening for the cable, the cable pull, or the line. The insert includes at least one thrust block to be inserted in the opening, by which the insert is supported in the region of the opening on the inner side of the bicycle frame after being inserted in the opening. The insert is removably fastened by at least one fastening element disposed at a distance from the thrust block such that the insert makes sealing contact at least in segments under pre-tension due to the interaction of the fastening element with the thrust block in the edge region transitioning into the peripheral contour of the underside of the insert facing the bicycle frame.

6 Claims, 3 Drawing Sheets

Figure 1:
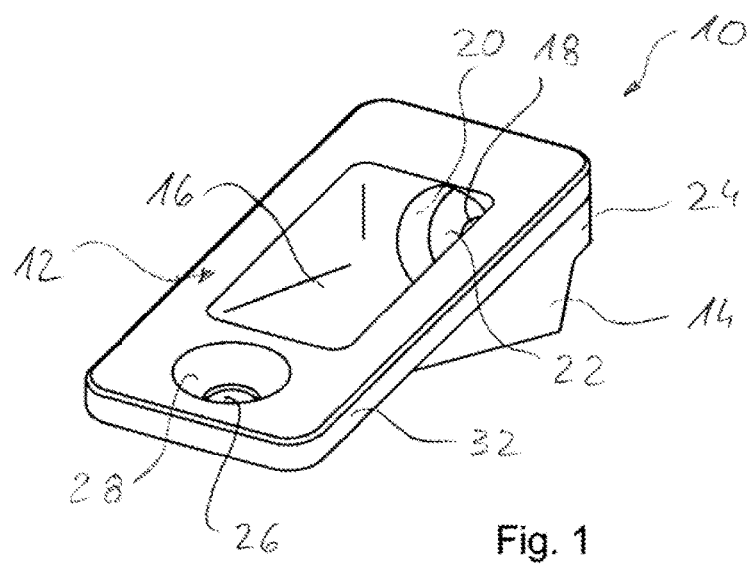

(51) Int. Cl.
*F16C 1/26* (2006.01)
*B62J 99/00* (2009.01)

(52) U.S. Cl.
CPC ... *B62J 2099/0046* (2013.01); *F16C 2326/20* (2013.01); *F16C 2326/28* (2013.01); *Y10T 74/2045* (2015.01)

(58) Field of Classification Search
CPC ... F16C 1/101–1/107; F16C 1/12; F16C 1/14; F16C 1/145; F16C 1/26; F16C 1/262; G16L 3/08; G16L 3/12
See application file for complete search history.

(56) References Cited

U.S. PATENT DOCUMENTS

| | | | |
|---|---|---|---|
| 4,517,408 A * | 5/1985 | Pegram | H02G 3/0641 174/153 G |
| 4,915,404 A | 4/1990 | Chonan | |
| 5,016,490 A * | 5/1991 | Jaksic | B60T 11/046 188/196 B |
| 5,433,465 A | 7/1995 | Klein et al. | |
| 5,478,100 A | 12/1995 | McDermitt et al. | |
| 5,681,126 A * | 10/1997 | Lin | E04C 5/165 403/292 |
| 5,836,212 A * | 11/1998 | Bates | F16C 1/106 248/73 |
| 7,645,946 B2 * | 1/2010 | Smith | F16L 5/02 174/650 |
| 2006/0254381 A1 * | 11/2006 | Chamberlain | B62J 11/00 74/502.4 |
| 2012/0011957 A1 | 1/2012 | Domahidy | |
| 2012/0175471 A1 * | 7/2012 | Lanz | B62J 99/00 248/73 |
| 2012/0261897 A1 | 10/2012 | Cote et al. | |

FOREIGN PATENT DOCUMENTS

| | | |
|---|---|---|
| EP | 2546132 | 1/2013 |
| EP | 2546132 A2 | 1/2013 |

OTHER PUBLICATIONS

German Office Action dated Jan. 20, 2016 from counterpart German App No. 10 2013 014 338.1.

* cited by examiner

INSERT FOR SECURING CABLES, CABLE LINES AND WIRES IN A BICYCLE FRAME

This application claims priority to German Patent Application DE102013014338.1 filed Aug. 28, 2013, the entirety of which is incorporated by reference herein.

The invention relates to an insert that can be removably fastened in a receiving opening provided on a bicycle frame for securing cables, cable pulls, or lines routed through the receiving opening, wherein the insert comprises a pass-through opening for the cable or the line.

For some time cables such as brake cables, hydraulic lines, cable pulls such as Bowden cable pulls and shifting cable pulls, or lines such as electrical lines for the lighting system or recently for actuating electrical drives have been routed in the bicycle frame at least in segments.

To this end corresponding openings are provided on the bicycle frame through which the cables, cable pulls, and lines are inserted into one of the tubes of the bicycle frame and led back out of the bicycle frame at a suitable location.

In order to secure the cables, cable pulls, and lines in opening and to prevent damage to the cables, cable pulls, and lines at the edges of the opening, it is typical that an insert made of an elastic material such as rubber is threaded onto the cable, cable pull, or line and clamped in the opening. Typically the insert, normally in the form of a hollow cylinder, has a receiving groove on the peripheral surface thereof by means of which the insert makes sealing contact with the inner peripheral surface of the round opening, while the peripheral bulges provided on both sides of the receiving groove on the outer and inner surfaces of the insert make sealing contact in the region of the opening.

A disadvantage of said known solution is that the inserts are typically sized to be relatively small in order to be securely retained in the openings. As a result, the openings are also sized to be correspondingly small, in turn making the threading in of the cables, cable pulls, and lines and particularly the threading out thereof through the opening out of the bicycle frame very difficult. It is furthermore often necessary to remove functional elements provided at the ends of the cables, cable pulls, and lines, such as threaded connections, cable pull nipples, plugs, etc. from one end of the cable, cable pull, or line prior to threading through and potentially to properly reattach the same after threading through.

The object of the present invention is to refine an insert of the type indicated above such that threading in and out cables, cable pulls, and lines is simplified with respect to the prior art.

The object is achieved according to the invention in that the insert comprises at least one thrust block to be inserted in the receiving opening, by means of which the insert is supported in segments on the inner side of the bicycle frame in the region of the receiving opening after inserting in the receiving opening, and that the insert can be removably fastened to the bicycle frame by means of at least one fastening element at a distance from the thrust block, such that the insert makes sealing contact at least in segments under pre-tension due to the interaction of the fastening element with the thrust block in the edge region transitioning into the peripheral contour of the underside thereof facing the bicycle frame.

According to the invention, the insert serving in the prior art only as a cable pull-out retainer also serves as a sealing closure element for correspondingly sized receiving opening on the bicycle frame.

In the prior art it was previously typical to size the receiving opening on the bicycle frame as small as possible, so that only the cable, the cable pull, or the line having the insert is retained under pre-tension in the receiving opening.

A completely different approach is selected according to the invention. The insert thus serves not only as a retainer against cable pull-out, but simultaneously as a cover for a receiving opening sized as large as possible, the size thereof being limited more by the rigidity of the tube or the frame segment of the bicycle frame in which the receiving opening is provided.

To this end, the invention proposes that the insert has a thrust block by means of which the insert is supported on the inner side of the bicycle frame after installation in the receiving opening. The required retaining of the insert in receiving opening is done by a fastening element provided at a distance from the thrust block. The insert further has a flat edge region at the transition of the peripheral contour thereof into the underside of the insert facing toward the bicycle frame, said region serving as a sealing surface. As soon as the insert is properly retained on the bicycle frame by means of the fastening element, the edge region makes contact over an area in the immediate peripheral region of the receiving opening on the bicycle frame, and seals off the gap between the insert and the bicycle frame.

The insert is thereby sized so that the receiving opening is not only completely closed off, but the peripheral region around the receiving opening is closed off as sealingly as possible by means of the insert.

The advantages of using the insert according to the invention are multiple. The receiving opening can be implemented as large as necessary on the bicycle frame in order to simplify the threading in and out of the cables, cable pulls, and lines in comparison with the prior art. Furthermore, depending on the application, different inserts can be used, such as inserts for cables, for cable pulls, or for lines. High flexibility is thus achieved, particularly in the manufacture of different bicycles. The same base frame can thus be used for different bicycles. In order to route different cables, cable pulls, or lines, the correspondingly prepared insert merely needs to be place at the corresponding receiving opening. If a hydraulic line for a hydraulic brake system is to be used, for example, then a different insert is used than, for example, for installing a Bowden cable pull.

Further advantages of the invention are found in the following description, the subclaims, and the drawings.

In order to route the cable, the cable pull, or the line in a defined manner particularly preferred in the region of the pass-through opening, and to protect the same against external influences, a particularly preferred embodiment of the insert according to the invention proposes that a molding protruding into the receiving opening is formed on the insert, in which the pass-through opening for the cable or the cable pull or the line is provided. The molding can be implemented in the form of a ramp protruding inward, for example, or in the form of a hollow cylinder protruding inward. The at least one pass-through opening for the cable, the cable pull, or the line is then provided on the molding. It is further conceivable that the region immediately around the pass-through opening is reinforced, for example by means of stiffening ribs, material reinforcements, and the like.

The thrust block in a particularly preferred embodiment of said insert is implemented as a protrusion on the molding by means of which the insert makes contact with an area on the inner side of the bicycle frame, while the molding, transitions into the flat edge region of the insert. Installing the insert is thus particularly made easier, because the thrust block positions the insert while installing and thereby aligns the molding in the correct position for installing.

For a further particularly preferred embodiment of the insert having a molding, the molding simultaneously acts as a support surface for the end of a cable or cable pull sheath. Cables, such as brake cables, or cable pulls, such as Bowden cable pulls, often have cladding that must be retained in a defined position in order to generate a relative motion between the cladding and the cable or cable pull, while the cable or cable pull is moved back and forth within the cladding by means of a suitable adjusting element, such as a brake lever or shift lever. Implementing a supporting surface on the molding thus ensures a defined support of the cladding. An additional connecting element can also be placed in the pass-through opening, on which the cladding of the cable or the cable pull is secured, for example by threading or latching.

In order to make it easier to install the insert on a cable, cable pull, or line, in a particularly preferred embodiment the insert is of divided construction at least in the region of the pass-through opening, such that before the insert is installed in the bicycle frame the pass-through opening can be opened over the entire axial length thereof for placing the cable or the cable pull or the line, and that when the insert is installed the pass-through opening is closed far enough that the cable or the line is secured at least in segments against pulling out.

The divided construction of the insert makes it possible to first insert the cable, the cable pull, or the line through the receiving openings formed in the bicycle frame and only then to place and secure the insert at the desired locations on the cable, the cable pull, and the line. It is also conceivable to use an insert with a pass-through opening having a uniform opening cross section and to cable pull a cuff or an intermediate sleeve, preferably sited, by means of which the cable, the cable pull, or the line is secured and retained under slight pre-tension in the pass-through opening after joining the insert together.

The divided construction of the insert as described above can also have a molding in which the pass-through opening is formed, wherein the molding in this variant as well protrudes into the receiving opening when the insert is installed.

For said embodiment, the molding is divided at least in the region of the pass-through opening and comprises two separately formed segments that are to be separated from each other prior to installing the insert so that the pass-through opening is opened sufficiently wide for inserting the cable or the cable pull or the line. After the insert has been installed in the receiving opening, the segments of the molding contact each other again at least in regions, such that the pass-through opening is closed to the extent that the cable or the cable pull or the line is secured against pulling out, optionally additionally using a cuff or an intermediate sleeve.

The insert having the divided pass-through opening is preferably designed in two pieces, wherein the parting plane passes through the pass-through opening and the optional molding.

A particularly preferred embodiment of the two-piece design of the insert has a connecting element formed on each segment of the molding. The two connecting elements then engage with each other when the two-piece insert is joined together as a unit having the cable, cable pull, or line disposed between the two pieces. The connecting elements can be implemented in the form of mutually engaging hooks or mutually engaging hinges, for example. A latching connection having latch openings and latch hooks to be latched therein is also conceivable.

In a particularly preferred embodiment, a fastening opening is provided on the insert for securing the insert, through which is guided the fastening element, such as a screw, a latching element, or the like, by means of which the insert can be removably attached to the bicycle frame. The fastening opening is thereby preferably formed on the side of the insert opposite the thrust block.

If the insert is formed in two pieces, then a particularly preferred embodiment has one eye having an opening formed on each part of the divided insert. The eyes are thereby disposed relative to each such that when the halves of the two-piece insert are joined together as a unit, the two eyes make contact with each other such that the openings are flush with each other and form the fastening opening. When using a screw as the fastening element, and when the previously describe connecting elements are provided, then a very precise and durable connection arises between the two parts of the insert.

It is also conceivable that additional latching tabs or comparable retaining elements are provided in the region of the fastening opening and prevent the fastening opening from opening, particularly immediately before installation.

The insert can be placed directly in the receiving opening and secured to the bicycle frame, particularly if the bicycle frame is made of a fiber-reinforced material, such as a carbon fiber-reinforced plastic. If the bicycle frame is made of metal tubes, however, such as aluminum tubes, it is proposed that the receiving opening is provided in a frame element, preferably made of metal, that is fastened to the bicycle frame.

The insert is preferably made of an injection-moldable plastic material. The invention also includes forming elements such as threaded bushings, sleeves, latch tabs, etc. made of metal in the insert made of plastic, so that said elements form an integral part of the insert.

Figure 2:
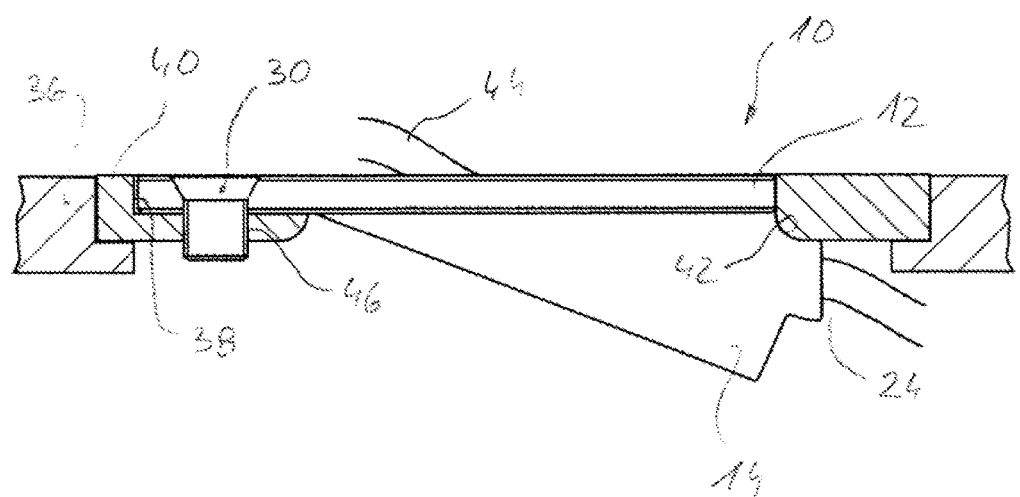
Figure 3:
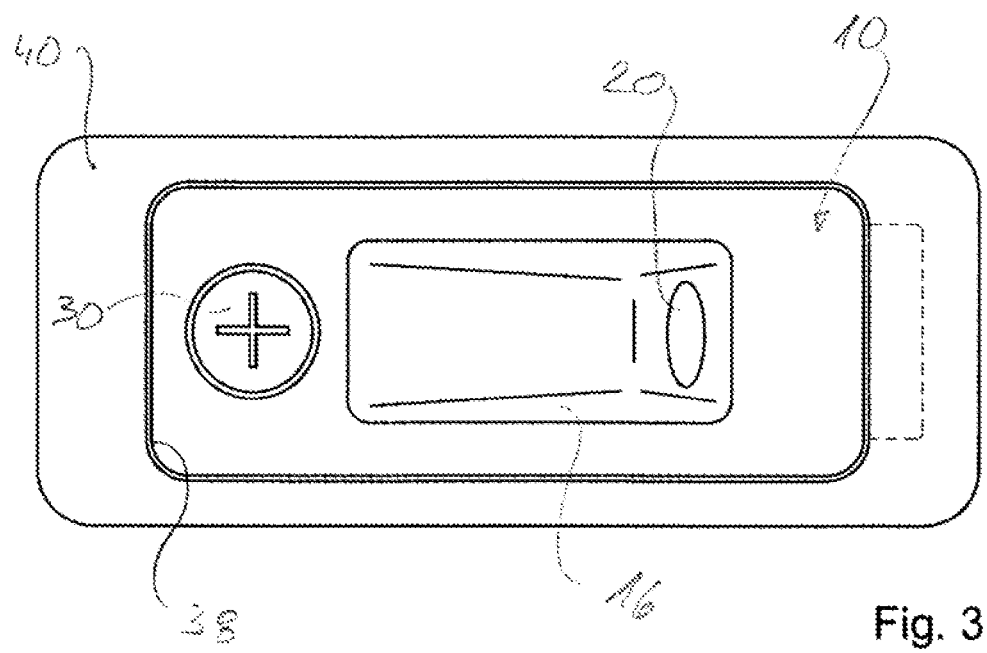
Figure 4:
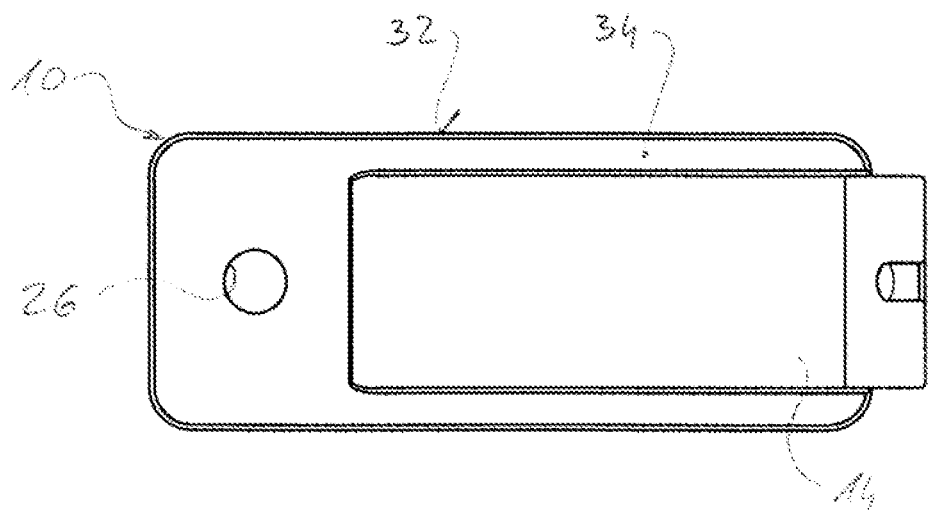
Figure 5:
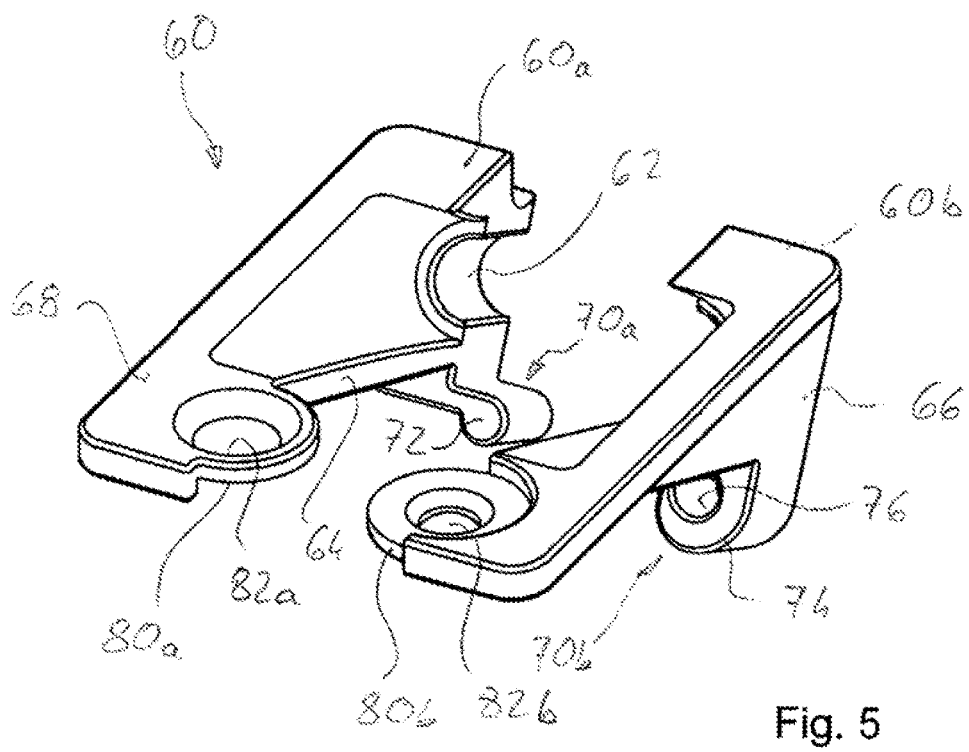
Figure 6:
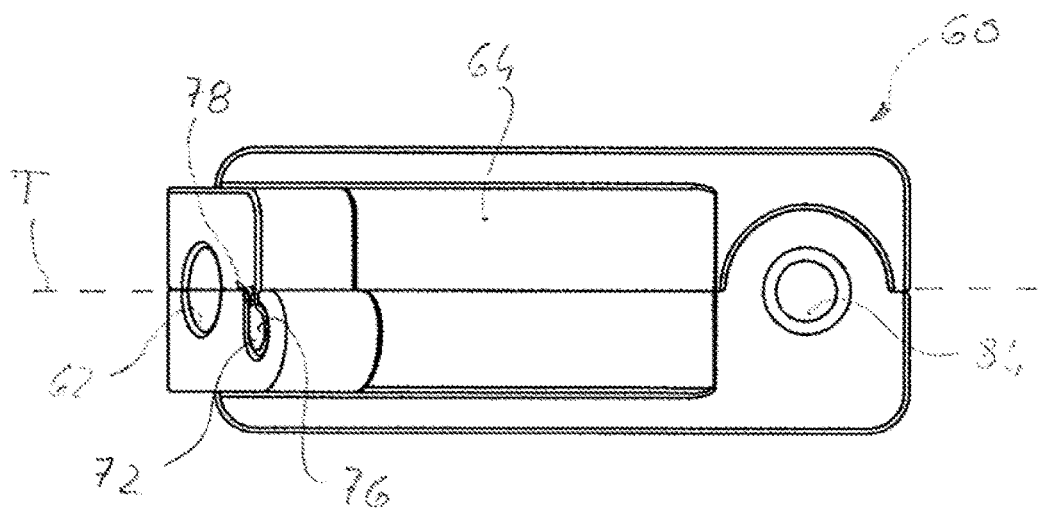

The invention is described in greeter detail below using two embodiment examples and referencing the drawing. Shown are:

FIG. 1 A perspective view of a first embodiment example of an insert according to the invention, FIG. 2 A partially section side view of the insert from FIG. 1 as installed on the bicycle frame, FIG. 3 A plan view of the insert from FIG. 1 in the ins lied state, FIG. 4 A bottom view of the insert from FIG. 1, FIG. 5 A perspective explosion view of a second embodiment example of an insert according to the invention, and FIG. 6 A bottom view of the insert from FIG. 5 in the assembled state.

FIG. 1 shows a perspective view of a first embodiment example of an insert 10 according to the invention. The insert 10 has a base plate 12 having a molding 14 protruding downward from the center thereof at the bottom side.

As is shown in the side view of the insert 10 shown in FIG. 2, the molding 14 has a ramp shape starting from the bottom side of the base plate 12, while the top side of the base plate 12 (cf. FIG. 1) is formed inward to make a ramp-shaped recess 16.

As FIG. 1 further shows, a pass-through opening 18 is formed at the end face of the recess 16 and extends through the end face to the back side of the molding 14. A segment 20 of greater diameter is further formed at the pass-through opening 18 and forms an offset 22 with the pass-through opening 18.

As FIG. 2 shows, the pass-through opening 18 extends through a protrusion formed as a material reinforcement 24 on the back side of the molding 14 and extends over the entire width of the back side of the molding 14. As is explained below, said material reinforcement 24 acts as a thrust block for the insert 10.

A fastening opening 26 is provided in the center on the base plate 12 on the side opposite the end face of the recess 16 and is equipped with a cone-shaped depression 28 for a flathead screw 30 (cf. FIG. 2).

As FIG. 4 shows, the molding 14 extends over only about % of the total width as viewed transverse to the width of the base plate 12 and is formed in the center between the side edges of the base plate 12. The edge region 34 transitioning directly in the peripheral contour 32 of the base plate 12 forms a sealing surface, as is explained below.

FIG. 2 shows the insert 10 in the installed position thereof. The insert 10 is thereby fastened to a bicycle frame 36 made of fiber-reinforced plastic. In order to ensure optimal fastening, the bicycle frame 36 has a frame element 40 in the region of a receiving opening 38 connected to the bicycle frame 36 in a known manner and to which the insert 10 is to be fastened.

In order to fasten the insert 10, the material reinforcement 24 thereof acting as a thrust block is threaded into the frame element 40 and inserted until the transition 42 of the material reinforcement 24 in the peripheral contour 32 of the base plate 12 makes contact with the peripheral edge of the receiving opening 38 formed in the frame element 40, while the top side of the material reinforcement 24 makes contact with the bottom side of the frame element 40. The insert 10 is then screwed to a thread 46 provided in the frame element 40 by means of the flathead screw 30. By screwing the insert 10 is pre-tensioned against the effect of the material reinforcement acting as a thrust block, wherein the edge region 34 of the insert 10 also makes sealing contact with the top side of the frame element 40 under pre-tension, as shown in FIG. 3.

If a cable 44 is now to be routed in the bicycle frame 36, for example, then the cable 44 is first inserted through the receiving opening 38 in the bicycle frame 36. Subsequently, or even immediately before inserting the cable 44 in the receiving opening 38, the cable 46 is pulled through the pass-through opening 18 of the insert 10. The outer diameter of the cladding of the cable 36 is thereby slightly larger than the inner diameter of the pass-through opening 18, so that the cable 44 is sealingly secured in the pass-through opening 18. The insert 10 is then fastened to the frame element 40 in the manner described.

The insert 10 is also suitable, however, as a thrust block for the cable pull cladding of a cable pull. The core of the cable pull is thereby drawn through the pass-through opening 18, while the end face of the cable pull cladding is supported on the offset 22 of the pass-through opening 18. The cable pull core is thus routed through the bicycle frame 36 without cladding and can be routed out of the bicycle frame 36 at a different location using a further insert 10 according to the invention, wherein here again a cable pull cladding optionally is supported on the insert 10 in the manner described above.

FIGS. 5 and 6 show a second embodiment example of an insert 60 according to the invention. The substantial construction of the insert 60 corresponds to the previously described construction of the insert 10. The insert 60, however, is implemented in two pieces, as shown particularly in FIG. 5, wherein a perspective explosion view of the insert 60 is shown.

As shown in FIG. 5, the insert 60 is divided in the longitudinal direction of the pass-through opening 62 in the region of the pass-through opening, so that a parting plane T is formed and splits the molding 64 and the material reinforcement 66 in the center.

In order to releasably connect the insert halves 60a and 60b thus arising, one connecting element 70a and 70b is formed on the bottom side of the material reinforcement 66 of each half of the insert 60a and 60b facing away from the base plate 68. The connecting element 70a of the insert half 60a shown on the left in FIG. 5 is implemented in the form of a cylindrical peg 72, the axis of symmetry thereof running parallel to the longitudinal axis of the pass-through opening 62 and protruding out of the material reinforcement 66 offset to one side.

The connecting element 70b of the insert half 60b is implemented as a hook-shaped extension 74 forming a hollow cylindrical receptacle having a round cross section and having a slit 78 on the side thereof to be faced toward the other half of the insert 60a. In order to connect the two insert halves 60a and 60b to each other, the peg 72 must simply be inserted or latched in the receptacle 76, as shown in FIG. 6, for example.

In order to prevent unintended opening of the insert 60, one eye 80a and 80b is implemented on each half of the insert 60a and 60b. The two eyes 80a and 80b are formed on the two halves of the insert 60a and 60b such that when the insert halves 60a and 60b are joined together as a unit, the eyes make contact with each other and thereby the openings 82a and 82b provided in each of the eyes 80a and 80b are flush to each other and together form the fastening opening 84 for a flathead screw.

The divided insert 60 is used particularly for cables, cable pulls, and lines wherein pulling the cables, cable pulls, or lines through the pass-through opening 18 of the insert 10 would be possible only with great effort, by removing and reattaching the functional elements, due to the presence of functional elements such as nipples, plugs, and the like. When using the divided insert 60, said insert must simply be opened, the cable, cable pull, or line placed in the opened pass-through opening 62, and the insert halves 60a and 60b of the insert 60 then connected to each other again.

The insert 60 thus joined together and the cable, cable pull, or line retained therein are then installed in a corresponding manner on the bicycle frame as previously described with reference to the insert 10.

LIST OF REFERENCE NUMERALS

10 Insert
12 Base plate
14 Molding
16 Recess
18 Pass-through opening
20 Larger diameter segment
22 Offset
24 Material reinforcement
26 Fastening opening
28 Depression
30 Flathead screw
32 Peripheral contour
34 Edge region
36 Bicycle frame
38 Receiving opening
40 Frame element
42 Transition
44 Cable 46 Thread
60 Insert
60a,b Insert halves
62 Pass-through opening
T Parting plane
64 Molding
66 Material reinforcement
68 Base plate
70a,b Connecting elements
72 Peg
74 Extension
76 Hollow cylindrical receptacle
78 Slit
80a,b Eye
82a,b Opening
84 Fastening opening

The invention claimed is:

1. An insert to be removably mounted in a receiving opening in a bicycle frame for securing cables, cable pulls, or lines led through the receiving opening, comprising:
 a body including:
  a base plate having a first surface;
  a recessed portion recessed into the body and away from the first surface, the recessed portion including an end wall positioned at one end of the recessed portion;
  a pass-through opening positioned in the end wall forming a passage through the body from an interior of the recessed portion to an opposite side of the body, the pass-through opening having a centerline running through the body from the interior of the recessed portion to the opposite side of the body;
 wherein the body is a multi-piece body including a first side component and a second side component separate from the first side component;
 wherein the body includes a first engagement surface and a second engagement surface;
 the first side component including the first engagement surface and the second side component including the second engagement surface, the first engagement surface and the second engagement surface engaging one another in an assembled state of the body and establishing a first split line of the body;
 wherein the first split line divides the pass-through opening into a first portion recessed into the first side component and a second portion recessed into the second side component such that in an unassembled state of the body, each of the first portion and the second portion have a concave shape open outwards toward the centerline such that the first side component and second side component can be assembled around an installed cable with the first portion and second portion aligned with the cable, and in the assembled state, the concave shapes of the first portion and the second portion face one another and align with one another to form and circumferentially enclose the pass-through opening along the centerline to encircle the cable and provide axial support to the cable;
 wherein the first side component includes a first eye including a first fastening opening and the second side component includes a second eye including a second fastening opening, with the first eye extending from the first side component beyond the first split line and the second eye extending from the second side component beyond the first split line such that in the assembled state of the body, the first eye and the first fastening opening overlap with the second eye and the second fastening opening to form a single fastening opening through both the first side component and the second side component.

2. The insert according to claim 1, wherein the end wall further comprises an inset portion surrounding the pass-through opening to act as a radial aligner for the cable with respect to the pass-through opening.

3. The insert according to claim 2, wherein one of the first side component and the second side component includes an extending connecting element and the other of the first side component and the second side component includes a recessed connecting element, wherein in the assembled state, the extending connecting element extends beyond the first split line toward the recessed connecting element, and engages the recessed connecting element to maintain the body in the assembled state.

4. The insert according to claim 3, wherein the extending connecting element engages the recessed connecting element in a direction aligned with the centerline of the pass-through opening.

5. The insert according to claim 1, and further comprising a frame element at least partially surrounding the body, with the body being attached to the frame element.

6. The insert according to claim 1, wherein the end wall includes a segment of greater diameter formed at the pass-through opening to form an offset with the pass-through opening for engaging an end face of a cable cladding.

* * * * *